(12) United States Patent
Takagi (10) Patent No.: US 11,097,572 B2
(45) Date of Patent: Aug. 24, 2021

(54) RUBBER COMPOSITION FOR TIRES, AND PNEUMATIC TIRE

(71) Applicant: THE YOKOHAMA RUBBER CO., LTD., Tokyo (JP)

(72) Inventor: Ryosuke Takagi, Kanagawa (JP)

(73) Assignee: THE YOKOHAMA RUBBER CO., LTD., Tokyo (JP)

( * ) Notice: Subject to any disclaimer, the term of this patent is extended or adjusted under 35 U.S.C. 154(b) by 0 days.

(21) Appl. No.: 16/982,164

(22) PCT Filed: Mar. 19, 2019

(86) PCT No.: PCT/JP2019/011553
§ 371 (c)(1),
(2) Date: Sep. 18, 2020

(87) PCT Pub. No.: WO2019/181968
PCT Pub. Date: Sep. 26, 2019

(65) Prior Publication Data
US 2021/0023886 A1 Jan. 28, 2021

(30) Foreign Application Priority Data
Mar. 22, 2018 (JP) .............................. JP2018-054849

(51) Int. Cl.
*B60C 11/00* (2006.01)
*B60C 11/12* (2006.01)
(Continued)

(52) U.S. Cl.
CPC ........ *B60C 11/0008* (2013.01); *B60C 1/0016* (2013.01); *B60C 11/0304* (2013.01);
(Continued)

(58) Field of Classification Search
CPC ............. B60C 11/0008; B60C 11/1236; B60C 11/1272; B60C 2011/0341;
(Continued)

(56) References Cited

U.S. PATENT DOCUMENTS 6,180,717 B1    1/2001  Kawazura et al.
2005/0070672 A1* 3/2005  Ozawa .................... C08C 19/38
                                                      525/331.9
(Continued)

FOREIGN PATENT DOCUMENTS

JP          10-7844 A      1/1998
JP         2016-6139 A     1/2016
(Continued)

OTHER PUBLICATIONS

International Search Report dated May 28, 2019 in corresponding International Application No. PCT/JP2019/011553, filed Mar. 19, 2019 (with English Translation).

*Primary Examiner* — Steven D Maki
*Assistant Examiner* — Philip N Schwartz
(74) *Attorney, Agent, or Firm* — Global IP Counsellors, LLP (57) ABSTRACT

A pneumatic tire includes 100 parts by mass of a rubber component including from 25-30 parts by mass of a diene rubber having a glass transition temperature of from −20° C. to −40° C., having a tertiary amine having an epoxy group as a modifying group, and a vinyl content from 35-45 mass %, 20-35 parts by mass of a diene rubber obtained by reacting a polyorganosiloxane to an active terminal of a diene-based polymer chain having the active terminal formed by making a polymer block A continuous with a polymer block B, the polymer block A including 80-95 mass % of isoprene and 5-20 mass % of an aromatic vinyl, having an active terminal, and having a weight average molecular weight from 500-15,000, the polymer block B including
(Continued)

1,3-butadiene and an aromatic vinyl and an active terminal, the vinyl content lower by from 5-25 mass % than that of the first conjugated diene polymer.

8 Claims, 3 Drawing Sheets

(51) Int. Cl.
*C08L 9/06* (2006.01)
*B60C 1/00* (2006.01)
*B60C 11/03* (2006.01)

(52) U.S. Cl.
CPC ...... *B60C 11/0306* (2013.01); *B60C 11/1236* (2013.01); *B60C 11/1272* (2013.01); *C08L 9/06* (2013.01); *B60C 2011/0341* (2013.01); *B60C 2011/0358* (2013.01); *C08L 2205/025* (2013.01); *C08L 2205/03* (2013.01)

(58) Field of Classification Search
CPC . B60C 2011/0358; B60C 1/0016; C08L 9/06; C08L 2205/025; C08L 2205/03
See application file for complete search history.

(56) References Cited

U.S. PATENT DOCUMENTS

| | | |
|---|---|---|
| 2017/0023355 A1 | 1/2017 | Tsujii et al. |
| 2017/0028351 A1 | 2/2017 | Spiegel et al. |

FOREIGN PATENT DOCUMENTS

| | | | |
|---|---|---|---|
| JP | 2016-47886 A | 4/2016 | |
| JP | 2016-169359 A | 9/2016 | |
| JP | 2019-52220 A | 4/2019 | |
| WO | 2017/138553 A1 | 8/2017 | |
| WO | WO-2017138553 A1 * | 8/2017 | ............ B60C 1/0016 |
| WO | WO-2017187734 A1 * | 11/2017 | ............. B60C 11/12 |
| WO | 2018/135530 A1 | 7/2018 | |

* cited by examiner

RUBBER COMPOSITION FOR TIRES, AND PNEUMATIC TIRE

This application is a U.S. National Stage application of International Application No. PCT/JP2019/011553, filed Mar. 19, 2019, which claims priority to Japanese Patent Application No. 2018-054849, filed Mar. 22, 2018, the contents of each of which are hereby incorporated herein by reference.

TECHNICAL FIELD

The present invention relates to a rubber composition for a tire mainly intended for use in a tread portion of a pneumatic tire, and a pneumatic tire using the rubber composition.

BACKGROUND ART

In recent years, there has been a demand to reduce tire rolling resistance from the perspective of fuel efficiency when a vehicle is traveling. Further, in terms of safety, improvement of wet performance (braking performance on wet road surfaces) is required. In particular for all-season tires, in addition to the performance, snow performance (braking performance on snowy road surfaces) is also required to be improved. Regarding these performances, for example, blending a rubber component forming a tread portion of a tire with a rubber having a low glass transition temperature is known to enable rolling resistance to be reduced and snow performance to be improved (For example, see Patent Document 1). However, blending rubber having a low glass transition temperature leads to a problem in that wet performance cannot be sufficiently ensured, and the performance cannot be provided in a well-balanced, compatible manner.

CITATION LIST

Patent Document

Patent Document 1: JP 2016-006139 A

SUMMARY OF INVENTION

Technical Problem

An object of the present invention is to provide a rubber composition for a tire and a pneumatic tire that improve braking performance on wet road surfaces and snowy road surfaces, reduce rolling resistance, and achieve the performance in a well-balanced manner.

Solution to Problem

A rubber composition for a tire according to an embodiment of the present invention that achieves the above object is a rubber composition including 100 parts by mass of a diene rubber composed of 25 parts by mass to 30 parts by mass of a first conjugated diene rubber having a vinyl content from 35 mass % to 45 mass %, 20 parts by mass to 35 parts by mass of a second conjugated diene rubber having a vinyl content lower by from 5 mass % to 25 mass % than that of the first conjugated diene rubber, and from 35 parts by mass to 50 parts by mass of a modified conjugated diene polymer, the first conjugated diene rubber having a glass transition temperature from −20° C. to −40° C. and having a tertiary amine having an epoxy group as a modifying group, the second conjugated diene rubber obtained by reacting a polyorganosiloxane to an active terminal of a conjugated diene-based polymer chain having the active terminal formed by making a polymer block A continuous with a polymer block B, the polymer block A including from 80 mass % to 95 mass % of isoprene and from 5 mass % to 20 mass % of aromatic vinyl, having an active terminal, and having a weight average molecular weight from 500 to 15000, the polymer block B including 1,3-butadiene and an aromatic vinyl, and having an active terminal, the modified conjugated diene polymer obtained by modifying an active terminal of a conjugated diene polymer having a cis-1,4-bond content of 75 mol % or greater with at least a hydrocarbyloxysilane compound.

Advantageous Effects of Invention

In the present invention, the above-mentioned three kinds of polymers (the first and second conjugated diene rubbers and conjugated diene polymer) are compounded each in an appropriate amount, and thus, braking performance on wet road surfaces (hereinafter, wet performance) and braking performance on snowy road surfaces (hereinafter, snow performance) as well as low rolling resistance performance (hereinafter, low rolling performance) can be provided in a well-balanced, compatible manner. In particular, the vinyl contents of the first and second conjugated diene rubbers are different, and the difference therebetween is set to from 5 mass % to 25 mass %, Thus, the wet performance and the snow performance are improved and can be provided in a compatible manner without deterioration of the low rolling performance.

In the rubber composition for a tire according to an embodiment of the present invention, 80 parts by mass or less of a filler containing at least silica is compounded based on 100 parts by mass of the diene rubber, and the compounding proportion of silica in the filler is preferably 80 mass % or greater. This enables low rolling performance to be improved while maintaining excellent wet performance and snow performance.

The rubber composition for a tire described above is preferably used in the tread portion of a pneumatic tire. In particular, preferably, at least four circumferential grooves including a pair of first main grooves extending in the tire circumferential direction and a pair of second main grooves extending outside the pair of first main grooves in the tire circumferential direction are formed on both sides of the tire equator in a tread portion, a first land portion is defined between the pair of first main grooves, a second land portion is defined between the first main groove and the second main groove, a plurality of first sipes having a groove width of 1 mm or less and extending in the tire width direction and a plurality of lateral grooves having a groove width of more than 1 mm are formed in the first land portion, each of the plurality of first sipes and each of the plurality of lateral grooves are arranged at an identical angle with respect to the tire circumferential direction and connected to one another, and each of the plurality of first sipes and each of the plurality of lateral grooves are open to either one of the pair of first main grooves. Additionally, preferably, in a second land portion, a plurality of second sipes extending in the tire width direction and a plurality of auxiliary grooves having a bent shape with one end being open to the second main groove and the other end being closed in the second land portion are formed, each of the plurality of second sipes is oriented in the identical direction to each of the plurality of first sipes, each of the plurality of auxiliary grooves including a first groove portion extending from the open end to the bent point and a second groove portion extending from the bend point to the closed end, the intersection angle of the first groove portion with respect to the second sipes being in the range from 45° to 90°. Use of the rubber composition for a tire described above in such a pneumatic tire not only provides wet performance and snow performance, and low rolling performance in a compatible manner due to the physical properties of the rubber composition, but also further improves the performance (particularly snow performance) due to the characteristics of the tread pattern.

Note that, in the description hereinbelow, a "ground contact region" is the region between end portions (contact ends) in the tire axial direction when the tire is mounted on a regular rim and inflated to a regular internal pressure, and placed vertically upon a flat surface with a regular load applied thereto. "Regular rim" is a rim defined by a standard for each tire according to a system of standards that includes standards on which tires are based, and refers to a "standard rim" in the case of JATMA, refers to a "design rim" in the case of TRA, and refers to a "measuring rim" in the case of ETRTO. In the system of standards, including standards with which tires comply, "regular internal pressure" is air pressure defined by each of the standards for each tire and is referred to as "maximum air pressure" in the case of JATMA, the maximum value being listed in the table "TIRE ROAD LIMITS AT VARIOUS COLD INFLATION PRESSURES" in the case of TRA, and is "INFLATION PRESSURE" in the case of ETRTO. However, "regular internal pressure" is 180 kPa in a case where a tire is a tire for a passenger vehicle. "Regular load" is a load defined by a standard for each tire according to a system of standards that includes standards on which tires are based, and refers to a "maximum load capacity" in the case of JATMA, refers to the maximum value in the table of "TIRE ROAD LIMITS AT VARIOUS COLD INFLATION PRESSURES" in the case of TRA, and refers to "LOAD CAPACITY" in the case of ETRTO. "Regular load" corresponds to 88% of the loads described above for a tire on a passenger vehicle.

DESCRIPTION OF EMBODIMENTS

Configurations of embodiments of the present invention will be described in detail below with reference to the accompanying drawings.

In a rubber composition for a tire according to the present invention, the rubber component is a diene rubber composed of a first conjugated diene rubber described below, a second conjugated diene rubber described below, and a modified conjugated diene polymer described below. The compounded amount of the first conjugated diene rubber is from 20 parts by mass to 35 parts by mass, the compounded amount of the second conjugated diene rubber is from 25 parts by mass to 30 parts by mass, and the compounded amount of the modified conjugated diene polymer is from 35 parts by mass to 50 parts by mass, in 100 parts by mass of the diene rubber. The first conjugated diene rubber and the second conjugated diene rubber are different particularly in the vinyl content. The vinyl content of the first conjugated diene rubber is from 35 mass % to 45 mass %, preferably from 40 mass % to 45 mass %, and the vinyl content of the second conjugated diene rubber is preferably from 20 mass % to 35 mass %, more preferably from 25 mass % to 30 mass %, and the difference therebetween is from 5 mass % to 25 mass %, preferably from 10 mass % to 20 mass %. Use of two types of conjugated diene rubbers each having an appropriately different vinyl content in this manner can improve the snow performance, wet performance, and rolling resistance in a well-balanced manner. When the difference between the vinyl contents is less than 5 mass %, the low rolling performance and snow performance deteriorate. When the difference between the vinyl contents exceeds 25 mass %, the effect of reducing the rolling resistance cannot be obtained.

Examples of the first conjugated diene rubber include styrene-butadiene rubbers produced by solution polymerization, configured to have a functional group at one terminal or both the terminals of the molecular chain, and the modifying group is a tertiary amine having an epoxy group. The vinyl content of the first conjugated diene rubber is from 35 mass % to 45 mass %, preferably from 40 mass % to 45 mass %, as described above. Furthermore, the glass transition temperature of the first conjugated diene rubber is from −20° C. to −40° C., preferably from −30° C. to −40° C. Use of a conjugated diene system having such a specific modifying group and satisfying the glass transition temperature and vinyl content described above can reduce the rolling resistance. Note that the vinyl content in the first conjugated diene rubber is measured using infrared emission spectroscopy (Hampton technique). For the glass transition temperature of the first conjugated diene rubber, differential scanning calorimetry (DSC) is performed at a rate of temperature increase of 20° C./minute to obtain a thermogram, and the temperature at the midpoint of the transition region is defined as the glass transition temperature. When the first conjugated diene rubber is an oil extended product containing an oil, the glass transition temperature is the glass transition temperature of the first conjugated diene rubber excluding the oil.

Examples of the tertiary amine having an epoxy group include 4,4'-diglycidyl-diphenylmethylamine and 4,4'-diglycidyl-dibenzylmethylamine.

The second conjugated diene rubber is a conjugated diene rubber composed by reacting a polyorganosiloxane to an active terminal of a conjugated diene-based polymer chain having the active terminal formed by making a polymer block A continuous with a polymer block B, the polymer block A including from 80 mass % to 95 mass % of isoprene and from 5 mass % to 20 mass % of aromatic vinyl, having an active terminal, and having a weight average molecular weight from 500 to 15000, the a polymer block B including 1,3-butadiene and an aromatic vinyl and having an active terminal.

Examples of the aromatic vinyl in the polymer block A include styrene, α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, vinylnaphthalene, dimethylaminomethylstyrene, and dimethylaminoethylstyrene, and the like. Among these, styrene is preferred. Such aromatic vinyl may be used alone, or a combination of two or more types may be used.

The weight average molecular weight (Mw) of the polymer block A is from 500 to 15000, preferably from 1000 to 12000, more preferably from 1500 to 10000, as described above. When the weight average molecular weight of the polymer block A is less than 500, the desired low rolling performance and wet performance are less likely to be expressed. When the weight average molecular weight of the polymer block A exceeds 15000, the balance of viscoelastic properties, which is an index of desired low rolling performance and wet performance, may be lost. The weight average molecular weight is a value measured by gel permeation chromatography (GPC) based on calibration with polystyrene.

The content of the isoprene unit content in the polymer block A may be preferably from 80 to 95 mass %, preferably from 85 to 95 mass %, and more preferably from 87 mass % to 95 mass %. The aromatic vinyl content in the polymer block A may be preferably from 5 to 20 mass %, preferably from 5 to 15 mass %, and more preferably from 5 to 13 mass %, as described above.

The polymer block A may contain monomer units other than isoprene and aromatic vinyl, but the content of monomer units other than isoprene and aromatic vinyl is only required to be preferably 15 mass % or less, more preferably 10 mass % or less, and more preferably 6 mass % or less. Examples of monomer units other than isoprene and aromatic vinyl include conjugated dienes other than isoprene such as 1,3-butadiene, 2,3-dimethyl-1,3-butadiene, 2-chloro-1,3-butadiene, 1,3-pentadiene, and 1,3-hexadiene; α- and β-unsaturated nitriles such as acrylonitrile and methacrylonitrile; unsaturated carboxylic acids or acid anhydrides such as acrylic acid, methacrylic acid, and maleic anhydride; unsaturated carboxylic acid esters such as methylmethacrylate, ethylacrylate, and butylacrylate; and non-conjugated dienes such as 1,5-hexadiene, 1,6-heptadiene, 1,7-octadiene, dicyclopentadiene, and 5-ethylidene-2-norbornene; and the like.

The specific examples and suitable aspects of the aromatic vinyl in the polymer block B are identical to those of the polymer block A and as described above. The 1,3-butadiene unit content in the polymer block B is not particularly limited, but may be preferably from 55 mass % to 95 mass %, and more preferably from 55 mass % to 90 mass %. The aromatic vinyl unit content in the polymer block B is not particularly limited, but may be preferably from 5 mass % to 45 mass %, and more preferably from 10 mass % to 45 mass %.

The polymer block B may have monomer units other than the 1,3-butadiene unit and aromatic vinyl unit. Examples of other monomers used to constitute other monomer units include those excluding 1,3-butadiene among "examples other than aromatic vinyl among monomers other than isoprene" described above, and isoprene. The content of the other monomer units in the polymer block B is preferably 50 mass % or less, more preferably 40 mass % or less, and further preferably 35 mass % or less.

The conjugated diene-based polymer chain having the active terminal formed by making the polymer block A continuous with the polymer block B is, from the perspective of productivity, constituted by the polymer block A-polymer block B, and the terminal of the polymer block B is preferably an active terminal. However, the conjugated diene-based polymer chain may have a plurality of polymer blocks A or may have other polymer blocks. Examples thereof include conjugated diene-based polymer chains having an active terminal, such as blocks composed only of a polymer block A-polymer block B-polymer block A and of polymer block A-polymer block B-isoprene. The mass ratio of the polymer block A to the polymer block B in the conjugated diene-based polymer chain having an active terminal described above (when there are a plurality of polymer blocks A and B, based on each total mass) is may be preferably from 0.001 to 0.1, more preferably from 0.003 to 0.07, and further preferably from 0.005 to 0.05, as (mass of the polymer block A)/(mass of the polymer block B).

Polyorganosiloxane is represented by the following Formula (1), wherein $R_1$ to $R_8$ are identical or different and are alkyl groups having from 1 to 6 carbons or aryl groups having from 6 to 12 carbons. $X_1$ and $X_4$ are identical or different and are groups selected from the group consisting of alkyl groups having from 1 to 6 carbons, aryl groups having 6 to 12 carbons, alkoxy groups having from 1 to 5 carbons, and epoxy group-containing groups having from 4 to 12 carbons. $X_2$ is an alkoxy group having from 1 to 5 carbons or an epoxy group-containing group having 4 to 12 carbons, and a plurality of $X_2$ may be identical or different. $X_3$ is a group containing 2 to 20 alkylene glycol repeating units, and a plurality of $X_3$ may be identical or different. m is an integer from 3 to 200, n is an integer from 0 to 200, and k is an integer from 0 to 200.

[Chemical Formula 1]

Formula (1)

The modified conjugated diene polymer is a conjugated diene polymer produced by solution polymerization, configured to have functional groups at both terminals of the molecular chain, in particular, obtained by modifying the active terminal of a conjugated diene polymer having a cis-1,4-bond content of 75 mol % or greater with at least a hydrocarbyloxysilane compound. By compounding such a modified conjugated diene polymer rubber, affinity with silica is increased, and dispersibility is improved. As a result, the effects of the silica are further improved and the low rolling performance and the wet performance can be improved.

The backbone of the modified conjugated diene polymer is formed by a copolymer obtained by copolymerizing a conjugated diene monomer unit and an aromatic vinyl monomer. Examples of the conjugated diene monomer unit include 1,3-butadiene, isoprene(2-methyl-1,3-butadiene), 2,3-dimethyl-1,3-butadiene, 2-chloro-1,3-butadiene, 1,3-pentadiene, and the like. Examples of the aromatic vinyl monomer include styrene, 2-methylstyrene, 3-methylstyrene, 4-methylstyrene, alpha-methylstyrene, 2,4-dimethylstyrene, 2,4-diisopropylstyrene, 4-tert-butylstyrene, divinylbenzene, tert-butoxystyrene, vinylbenzyldimethylamine, (4-vinylbenzyl)dimethylaminoethyl ether, N,N-dimethyl aminoethylstyrene, vinyl pyridine, and the like.

Examples of the hydrocarbyloxysilane compound can include N,N-bis(trimethylsilyl)-3-aminopropyltrimethoxysilane, N,N-bis(trimethylsilyl)-3-aminopropyltriethoxysilane, N,N-bis(trimethylsilyl)aminoethyltrimethoxysilane, N,N-bis(trimethylsilyl)aminoethyltriethoxysilane, and the like.

The rubber composition for a tire according to an embodiment of the present invention preferably includes at least a filler containing silica in the diene rubber described above. By compounding a filler containing silica, the wet performance of the rubber composition for a tire can be improved. The silica that is used may be a silica that is ordinarily used in rubber compositions for tires such as, for example, wet silica, dry silica, surface-treated silica, or the like. The silica may be appropriately selected from commercially available products. Silica obtained by a normal manufacturing method can also be used. Examples of the filler other than silica include carbon black, clay, calcium carbonate, talc, mica, and the like. The compounded amount of the filler is preferably 80 parts by mass or less, and more preferably from 55 parts by mass to 75 parts by mass with respect to 100 parts by mass of the diene rubber described above. When the compounded amount of the filler exceeds 80 parts by mass, the effect of improving the snow performance and the effect of reducing the rolling resistance will be restrictive. The compounding proportion of the silica in the filler is preferably 80 mass % or greater and more preferably from 83 mass % to 93 mass %. When the compounding proportion of the silica is less than 80 mass %, the wet performance decreases.

In the rubber composition for a tire according to an embodiment of the present invention, compounding agents other than those above may also be added. Examples of other compounding agents include various compounding agents generally used in rubber compositions for a pneumatic tire, such as vulcanization accelerators, anti-aging agents, liquid polymers, thermosetting resins, thermoplastic resins, and the like. These compounding agents can be compounded in typical amounts conventionally used so long as the object of the present invention is not hindered. As a kneader, a typical kneader for a rubber, such as a Banbury mixer, a kneader, or a roller may be used.

The rubber composition for a tire according to an embodiment of the present invention described above can be used in the tread portion of a pneumatic tire. The structure of the pneumatic tire to which the rubber composition for a tire according to an embodiment of the present invention is applied is not particularly limited. However, as long as the structure of the pneumatic tire is excellent in any of the three performances described above, coaction of the performance ascribed to the rubber composition and the performance ascribed to the tire structure can provide wet performance, snow performance, and low rolling performance at a higher degree of in a compatible manner. For example, the pneumatic tires shown in FIGS. 1 to 3 have excellent snow performance as described below, and the rubber composition for a tire according to an embodiment of the present invention can be preferably used therefor.

Figure 1:
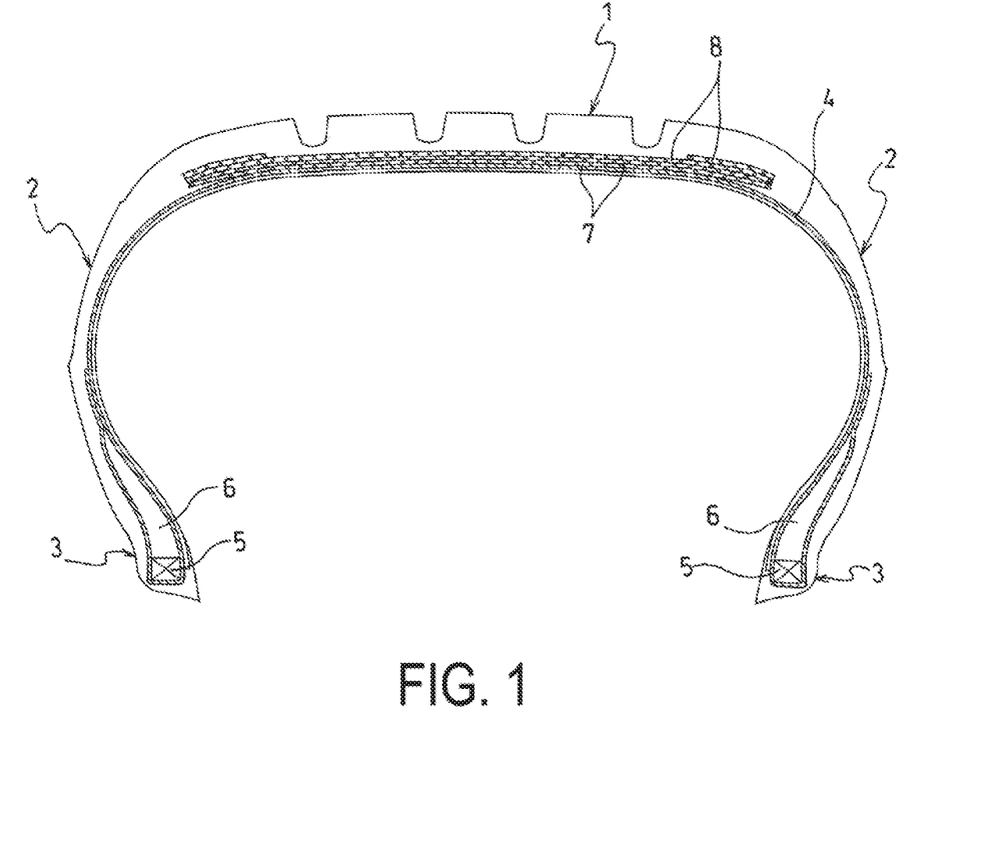
FIG. 1 is a meridian cross-sectional view illustrating one example of a pneumatic tire according to an embodiment of the present invention.

As illustrated in FIG. 1, a pneumatic tire of an embodiment of the present invention includes a tread portion 1, a pair of sidewall portions 2 disposed on both sides of the tread portion 1, and a pair of bead portions 3 disposed inward of the sidewall portions 2 in a tire radial direction. Additionally, FIG. 1 is a meridian cross-sectional view, and accordingly, although not illustrated, each of the tread portion 1, the sidewall portion 2, and the bead portions 3 extends in the tire circumferential direction to form an annular shape. Thus, the basic structure of the toroidal shape of the pneumatic tire is configured. The other tire constituent members depicted in the meridian cross-sectional view also extend in the tire circumferential direction to form an annular shape, unless otherwise specified.

A carcass layer 4 is mounted between the left-right pair of bead portions 3. The carcass layer 4 includes a plurality of reinforcing cords extending in the tire radial direction, and is folded back around a bead core 5 disposed in each of the bead portions 3 from a vehicle inner side to a vehicle outer side. Additionally, bead fillers 6 are disposed on the periphery of the bead cores 5, and each bead filler 6 is enveloped by a main body portion and a folded back portion of the carcass layer 4. On the other hand, in the tread portion 1, a plurality of belt layers 7 (two layers in FIG. 1) are embedded on an outer circumferential side of the carcass layer 4. The belt layers 7 each include a plurality of reinforcing cords that are inclined with respect to the tire circumferential direction, with the reinforcing cords of the different layers arranged in a criss-cross manner. In these belt layers 7, the inclination angle of the reinforcing cords with respect to the tire circumferential direction ranges from, for example, 10° to 40°. In addition, a belt reinforcing layer 8 is provided on the outer circumferential side of the belt layers 7. The belt reinforcing layer 8 includes organic fiber cords oriented in the tire circumferential direction. In the belt reinforcing layer 8, the angle of the organic fiber cords with respect to the tire circumferential direction is set, for example, to from 0° to 5°.

A tread rubber layer is disposed on the outer circumferential side of the carcass layer 4 in the tread portion 1. A side rubber layer is disposed on the outer circumferential side (outer side in the tire width direction) of the carcass layer 4 in each of the sidewall portions 2. A rim cushion rubber layer is disposed on the outer circumferential side (outer side in the tire width direction) of the carcass layer 4 in each of the bead portions 3. The tread rubber layer may have a structure in which two types of rubber layers (a cap tread rubber layer and an undertread rubber layer) with differing physical properties are layered in the tire radial direction. The rubber composition for a tire according to an embodiment of the present invention is used in the tread rubber layer of these rubber layers.

Figure 2:
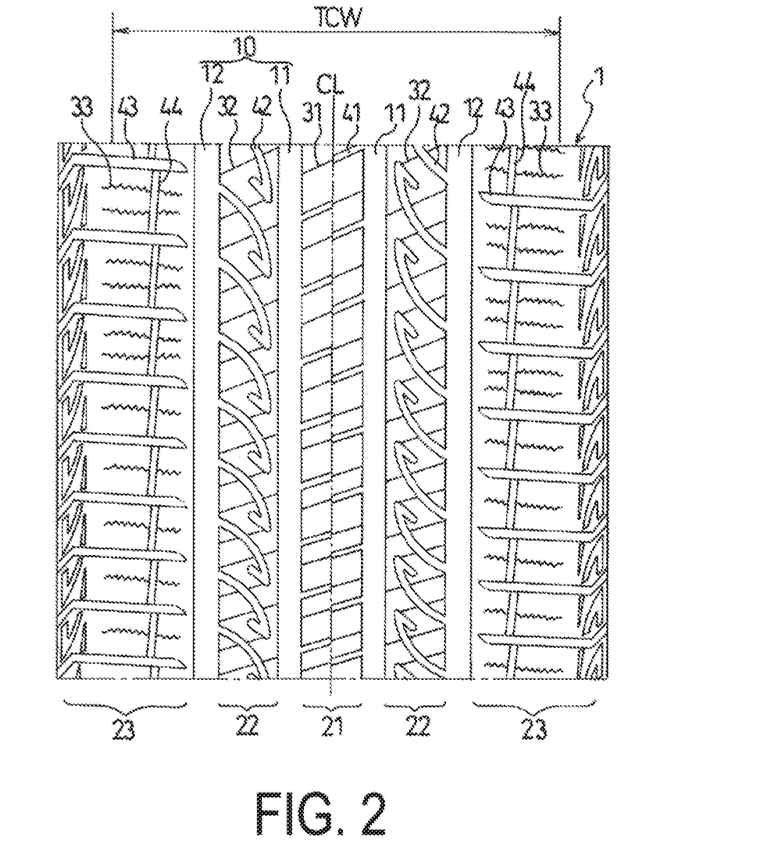
FIG. 2 is a developed view illustrating an example of a tread pattern of the pneumatic tire according to the embodiment of the present invention.

In FIG. 2, CL is the tire equator, TCW is the ground contact width, and the region within this ground contact width TCW is the ground contact region. As illustrated in FIG. 2, the tread portion 1 is formed with at least four circumferential grooves 10 extending in the tire circumferential direction. The circumferential groove 10 includes a pair of first main grooves 11 extending in the tire circumferential direction at position on either side of the tire equator CL, and a pair of second main grooves 12 extending in the tire circumferential direction at position further outward than the first main grooves 11 in the tire width direction. Dimensions of the first main groove 11 and the second main groove 12 are not particularly limited and, for example, a groove width is set to be in a range from 5.0 mm to 15.0 mm and a groove depth is set to be in a range from 6.0 mm to 10.0 mm.

Accordingly, a first land portion 21 extending in the tire circumferential direction is defined between the first main grooves 11, 11, a second land portion 22 extending in the tire circumferential direction is defined between the first main groove 11 and the second main groove 12, and a third land portion 23 is defined outward in the tire width direction of the second main groove 12 (the groove located most outward in the tire width direction of the circumferential grooves 10).

A plurality of first sipes 31 extending in the tire width direction and a plurality of lateral grooves 41 extending in the tire width direction are formed in the first land portion 21 located on the tire equator CL. The first sipes 31 have a groove width of 1 mm or less, while the lateral grooves 41 have a groove width of more than 1 mm, and more preferably from more than 1.0 mm to 3.0 mm. The first sipes 31 and the lateral grooves 41 are arranged at an identical angle with respect to the tire circumferential direction and each connected to each other, and each of the first sipes 31 and the lateral grooves 41 is opened to either one of the pair of first main grooves 11 and 11. In a more preferable aspect, each of the plurality of first sipes 31 is arranged so that some of the plurality of first sipes 31 communicating with the first main groove 11 on one side and others communicating with the first main groove 11 on the other side are alternately located along the tire circumferential direction. Each of the plurality of lateral grooves 41 is arranged so that some of the lateral grooves 41 communicating with the first main groove 11 on the other side and others communicating with the first main groove 11 on one side are alternately located along the tire circumferential direction.

Figure 3:
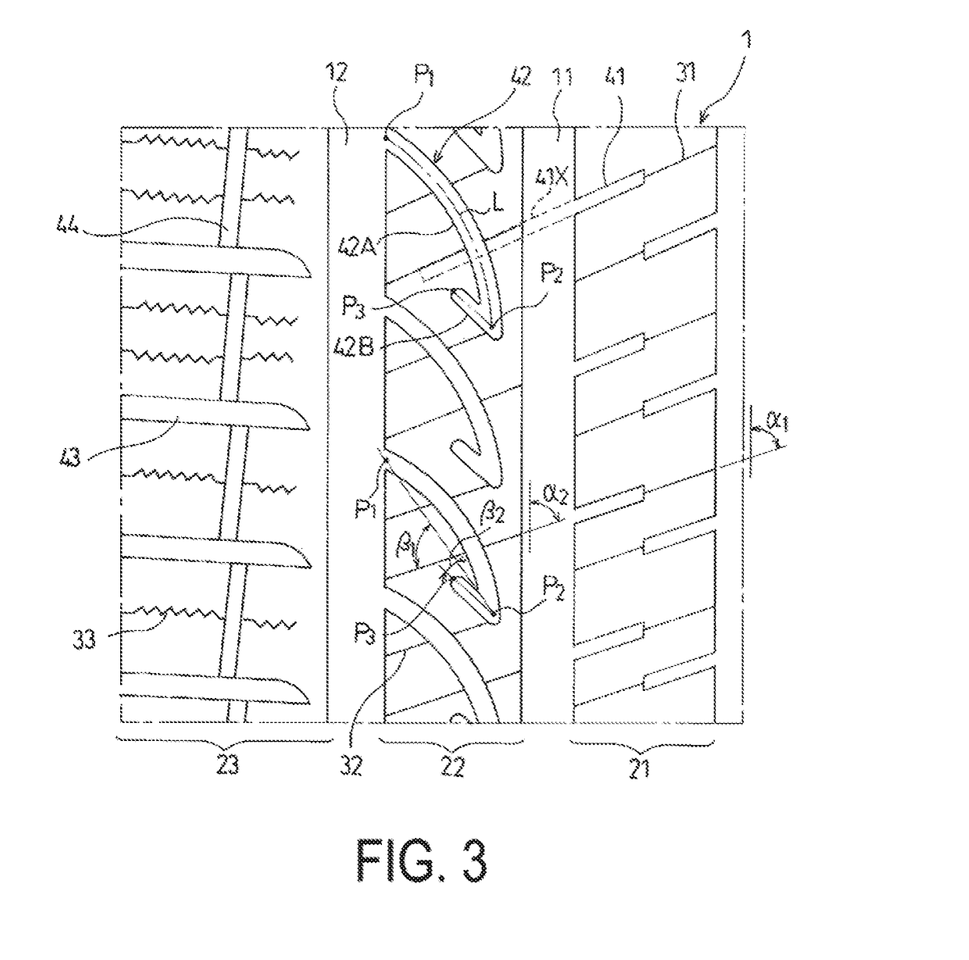
FIG. 3 is a plan view extracting and showing a first land portion, a second land portion, and a third land portion in the tread pattern of FIG. 2 in an extracted manner. Note that the third land portion is a portion within the ground contact region.

A plurality of second sipes 32 extending in the tire width direction and a plurality of auxiliary grooves 42 having a bent shape with one end being open to the second main groove 12 and the other end being closed in the second land portion 22 are formed in each of the second land portions 22 located outward of the first main grooves 11. The second sipes 32 of the second land portion 22 have a groove width of 1 mm or less and are oriented in the identical direction to the first sipe 31 of the first land portion 21. More specifically, as shown in FIG. 3, when the angle of the first sipes 31 with respect to the tire circumferential direction is $\alpha_1$ and the angle of the second sipes 32 with respect to the tire circumferential direction is $\alpha_2$, the difference therebetween ($|\alpha_2-\alpha_1|$) is preferably 10° or less.

The auxiliary groove 42 has a shape bent in a fishing hook shape and is bent at a bend point $P_2$ on the center line L. The auxiliary groove 42 has a first groove portion 42A extending from an open end $P_1$ to the bend point $P_2$ and a second groove portion 42B extending from the bend point $P_2$ to a closed end $P_3$. The intersection angle $\beta_1$ of the first groove portion 42A with respect to the second sipes 32 is preferably set to be in a range from 45° to 90°. This intersection angle $\beta_1$ is an angle formed by the straight line connecting the open end $P_1$ of the auxiliary groove 42 and the bend point $P_2$ with respect to the second sipe 32. Additionally, a bending angle $\beta_2$ of the second groove portion 42B with respect to the first groove portion 42A is preferably set to be in a range from 0° to 45°. This bending angle $\beta_2$ is an angle formed by the straight line connecting the bend point $P_2$ and the closed end $P_3$ of the auxiliary groove 42 with respect to the straight line connecting the open end $P_1$ and the bend point $P_2$. Further, the length a of the first groove portion 42A and the length b of the second groove portion 42B preferably satisfy the relationship 0.05×a≤b≤0.4×a. The length a of the first groove portion 42A is the length from the open end $P_1$ to the bend point $P_2$ measured along the center line L of the auxiliary groove 42, and the length b of the second groove portion 42B is the length from the bend point $P_2$ to the closed end $P_3$ measured along the center line L of the auxiliary groove 42.

A plurality of lug grooves 43 extending in a tire width direction and a plurality of vertical grooves 44 that connect the lug grooves 43 adjacent in the tire circumferential direction to each other are formed in the third land portion 23 located in the shoulder region of the tread portion 1. Each of the lug grooves 43 is not communicating with the second main groove 12. A plurality of third sipes 33 extending in the tire width direction are also formed in the third land portion 23. These third sipes 33 are not communicating with the second main groove 12. The shape of the third sipe 33 is not particularly limited, but here, a zigzag shape is adopted from the perspective of ensuring rigidity.

In the pneumatic tire described above, each of the plurality of first sipes 31 and each of the plurality of lateral grooves 41 are formed in the first land portion 21. The plurality of first sipes 31 and the plurality of lateral grooves 41 are arranged at an the identical with respect to the tire circumferential direction and each connected to each other, and each of the first sipes 31 and the lateral grooves 41 is opened to either one of the pair of first main grooves 11 and 11. Thus, the rigidity of the first land portion 21 can be ensured in comparison with a case where the first land portion 21 is divided only by thick grooves extending in the tire width direction, and snow removability can be improved in comparison with a case where the first land portion 21 is divided only by narrow sipes extending in the tire width direction.

Additionally, unifying the orientation of the first sipes 31 disposed in the first land portion 21 and the orientation of the second sipes 32 disposed in the second land portion 22 makes the first sipes 31 and the second sipes 32 likely to open when traveling on snow, which enables snow removability to be improved. In addition, the auxiliary grooves 42 having a bent shape with one end closed are formed in the second land portion 22, the intersection angle $\beta_1$ of the first groove portion 42A of the auxiliary groove 42 with respect to the second sipes 32 is in a predetermined range, and the length a of the first groove portion 42A of the auxiliary groove 42 and the length b of the second groove portion 42B of the auxiliary groove 42 satisfy a predetermined relationship. Thus, snow traction can be improved while the rigidity of the second land portion 22 is secured. This enables snow performance to be improved while maintaining good steering stability on dry road surfaces.

Further, the plurality of lug grooves 43 extending in the tire width direction and not communicating with the second main grooves 12 and the plurality of vertical grooves 44 that connect the lug grooves 43, 43 adjacent in the tire circumferential direction to each other are formed in the third land portion 23 located outward of the of the second main groove 12 (the groove located most outward in the tire width direction of the circumferential grooves 10). Thus, the snow performance can be improved based on the lug grooves 43 and the vertical grooves 44. Moreover, the lug grooves 43 disposed in the third land portion 23 are not communicating with the second main grooves 12. Thus, the rigidity of the third land portion 23 is ensured, and the steering stability on dry road surfaces can be improved.

Here, if the intersection angle 131 of the first groove portion 42A of the auxiliary groove 42 with respect to the second sipes 32 is less than 45°, the rigidity of the second land portion 22 decreases to degrade the steering stability on dry road surfaces. In particular, the intersection angle $\beta_1$ is only required to be in the range from 45° to 90°. Further, in a case where the length b of the second groove portion 42B of the auxiliary groove 42 is 0.05 times shorter than the length a of the first groove portion 42A, the effect of improving the snow performance becomes insufficient, and conversely, if 0.4 times larger than the length a of the first groove portion 42A, the steering stability on dry road surface deteriorates. In particular, the length a of the first groove portion 42A and the length b of the second groove portion 42B are only required to satisfy the relationship 0.1×a≤b<0.3×a.

The present invention is further explained below by examples. However, the scope of the present invention is not limited to these examples.

Example

Compounding ingredients other than vulcanization accelerators and sulfur were weighed for each of 16 types of rubber compositions for a tread shown in Tables 1 to 2 (Standard Example 1, Comparative Examples 1 to 7, and Examples 1 to 8). These compounding ingredients were kneaded in a 1.7 L sealed Banbury mixer for 5 minutes. Then, a master batch was discharged at a temperature of 150° C. and cooled at room temperature. The master batch was then added to the same 1.7 L sealed Banbury mixer and the vulcanization accelerators and sulfur were added. Then, the master batch was mixed for 2 minutes to produce the rubber compositions for a tread.

Further, pneumatic tires were produced with each rubber composition for a tire used for the tread portion. Each pneumatic tire had a tire size of 205/55R16 91V and the basic structure illustrated in FIG. 1 and was based on the tread pattern illustrated in FIG. 2. The presence or absence of the lateral grooves and the first sipes with respect to the structure of the first land portion and the intersection angle of the first groove portion of the auxiliary groove with respect to the second sipes with respect to the structure of the second land portion were set as shown in Tables 1 to 2. The snow performance, wet performance, and low rolling performance were evaluated according to the methods described below.

Note that in Tables 1 to 2, the compounded amounts of conjugated diene rubbers 1 to 4 describe the compounded amounts of the net rubber component excluding the oil content of an oil extended product. In respect of the "First land portion" row in Tables 1 to 2, "Yes" was indicated in the rows of the element provided and "No" was indicated in the rows of the element not provided, among the "Lateral groove" and "First sipe" in the first land portion of the aspect of FIGS. 2 and 3. Specifically, in Example 5, only the lateral grooves are provided without forming the first sipes in the aspect of FIGS. 2 and 3. In Example 6, only the first sipes are provided without forming the lateral grooves in the aspect of FIGS. 2 and 3. In the other examples, both the lateral grooves and the first sipes are provided as in the aspect of FIGS. 2 and 3.

Snow Performance

The test tires were assembled on wheels with a rim size of 16×6.5 JJ, inflated to an air pressure of 200 kPa, and mounted on a test vehicle (front wheel drive vehicle) having an engine displacement of 1600 cc. Braking distance was measured after ABS braking from a state of driving at a speed of 40 km/h until the vehicle came to a stop on a test course with a pressurized snow road. The evaluation results are expressed as index values using the reciprocal of the measurement values, with the Standard Example 1 being assigned the index of 100. Larger index values indicate shorter braking distance and superior snow performance.

Wet Performance

The test tires were assembled on wheels with a rim size of 16×6.5 JJ, inflated to an air pressure of 200 kPa, and mounted on a test vehicle (front wheel drive vehicle) having an engine displacement of 1600 cc. Braking distance was measured after ABS braking from a state of driving at a speed of 40 km/h until the vehicle came to a stop on a test course with a wet road surface. The evaluation results are expressed as index values using the reciprocal of the measurement values, with the Standard Example 1 being assigned the index of 100. Larger index values indicate shorter braking distance and superior wet performance.

Low Rolling Performance

Each test tire was mounted on a wheel having a rim size of 16×6.5 JJ and inflated to an air pressure of 200 kPa. Using an indoor drum testing machine (drum diameter: 1707 mm), rolling resistance was measured when the tire was driven at a speed of 80 km/h while pushed against the drum under a load equivalent to 85% of the maximum load at the air pressure described in the 2009 JATMA Year Book. The evaluation results are expressed as index values using the reciprocal of the measurement values, with the Standard Example 1 being assigned the index of 100. A larger index value indicates lower rolling resistance and excellent low rolling performance.

TABLE 1

| | | | Standard Example 1 | Comparative Example 1 | Comparative Example 2 | Comparative Example 3 | Comparative Example 4 |
|---|---|---|---|---|---|---|---|
| Composition | Conjugated diene rubber 1 | Parts by mass | | 40 | 5 | 20 | 55 |
| | Conjugated diene rubber 2 | Parts by mass | 70 | 15 | 50 | 25 | 25 |
| | Conjugated diene rubber 3 | Parts by mass | | | | | |
| | Conjugated diene rubber 4 | Parts by mass | | | | | |
| | Conjugated diene polymer 1 | Parts by mass | | 45 | 45 | 55 | 20 |
| | Conjugated diene polymer 2 | Parts by mass | 30 | | | | |
| | Difference between Vn amounts of two conjugated diene rubbers | Mass % | — | 14 | 14 | 14 | 14 |
| | Total amount of filler | Parts by mass | 60 | 70 | 70 | 70 | 70 |
| | Carbon black | Parts by mass | 15 | 5 | 5 | 5 | 5 |
| | Silica | Parts by mass | 45 | 65 | 65 | 65 | 65 |
| | Proportion of silica in filler | Mass % | 75 | 93 | 93 | 93 | 93 |
| | Silane coupling agent | Parts by mass | 4.5 | 6.5 | 6.5 | 6.5 | 6.5 |
| | Aroma oil | Parts by mass | 5 | 5 | 5 | 5 | 5 |
| | Stearic acid | Parts by mass | 2 | 2 | 2 | 2 | 2 |
| | Zinc oxide | Parts by mass | 3 | 3 | 3 | 3 | 3 |
| | Anti-aging agent | Parts by mass | 4 | 4 | 4 | 4 | 4 |
| | Sulfur | Parts by mass | 1 | 1 | 1 | 1 | 1 |
| | Vulcanization accelerator 1 | Parts by mass | 2 | 2 | 2 | 2 | 2 |
| | Vulcanization accelerator 2 | Parts by mass | 2 | 2 | 2 | 2 | 2 |
| Structure | First land portion | Lateral groove | | Yes | Yes | Yes | Yes | Yes |
| | | First sipe | | Yes | Yes | Yes | Yes | Yes |
| | Second land portion | Intersection angle | ° | 80 | 80 | 80 | 80 | 80 |

TABLE 1-continued

|  |  |  |  |  |  |  |  |
|---|---|---|---|---|---|---|---|
| Snow performance | | Index value | 100 | 97 | 106 | 110 | 95 |
| Wet performance | | Index value | 100 | 105 | 97 | 93 | 107 |
| Low rolling performance | | Index value | 100 | 105 | 107 | 107 | 105 |

|  |  |  |  | Comparative Example 5 | Comparative Example 6 | Comparative Example 7 |
|---|---|---|---|---|---|---|
| Composition | Conjugated diene rubber 1 | | Parts by mass | 25 | 25 | 25 |
| | Conjugated diene rubber 2 | | Parts by mass | | | 30 |
| | Conjugated diene rubber 3 | | Parts by mass | 30 | | |
| | Conjugated diene rubber 4 | | Parts by mass | | 30 | |
| | Conjugated diene polymer 1 | | Parts by mass | 45 | 45 | |
| | Conjugated diene polymer 2 | | Parts by mass | | | 45 |
| | Difference between Vn amounts of two conjugated diene rubbers | | Mass % | 13 | −15 | 14 |
| | Total amount of filler | | Parts by mass | 70 | 70 | 70 |
| | Carbon black | | Parts by mass | 5 | 5 | 5 |
| | Silica | | Parts by mass | 65 | 65 | 65 |
| | Proportion of silica in filler | | Mass % | 93 | 93 | 93 |
| | Silane coupling agent | | Parts by mass | 6.5 | 6.5 | 6.5 |
| | Aroma oil | | Parts by mass | 5 | 5 | 5 |
| | Stearic acid | | Parts by mass | 2 | 2 | 2 |
| | Zinc oxide | | Parts by mass | 3 | 3 | 3 |
| | Anti-aging agent | | Parts by mass | 4 | 4 | 4 |
| | Sulfur | | Parts by mass | 1 | 1 | 1 |
| | Vulcanization accelerator 1 | | Parts by mass | 2 | 2 | 2 |
| | Vulcanization accelerator 2 | | Parts by mass | 2 | 2 | 2 |
| Structure | First land portion | Lateral groove | | Yes | Yes | Yes |
| | | First sipe | | Yes | Yes | Yes |
| | Second land portion | Intersection angle | ° | 80 | 80 | 80 |
| Snow performance | | | Index value | 105 | 103 | 101 |
| Wet performance | | | Index value | 103 | 103 | 103 |
| Low rolling performance | | | Index value | 99 | 98 | 97 |

TABLE 2

|  |  |  | Example 1 | Example 2 | Example 3 | Example 4 |
|---|---|---|---|---|---|---|
| Composition | Conjugated diene rubber 1 | Parts by mass | 25 | 25 | 25 | 25 |
| | Conjugated diene rubber 2 | Parts by mass | 30 | 30 | 30 | 30 |
| | Conjugated diene rubber 3 | Parts by mass | | | | |
| | Conjugated diene rubber 4 | Parts by mass | | | | |
| | Conjugated diene polymer 1 | Parts by mass | 45 | 45 | 45 | 45 |
| | Conjugated diene polymer 2 | Parts by mass | | | | |
| | Difference between Vn amounts of two conjugated diene rubbers | Mass % | 14 | 14 | 14 | 14 |
| | Total amount of filler | Parts by mass | 70 | 100 | 50 | 75 |
| | Carbon black | Parts by mass | 5 | 5 | 5 | 20 |
| | Silica | Parts by mass | 65 | 95 | 45 | 55 |
| | Proportion of silica in filler | Mass % | 93 | 95 | 90 | 73 |
| | Silane coupling agent | Parts by mass | 6.5 | 6.5 | 6.5 | 5.5 |
| | Aroma oil | Parts by mass | 5 | 5 | 5 | 5 |
| | Stearic acid | Parts by mass | 2 | 2 | 2 | 2 |
| | Zinc oxide | Parts by mass | 3 | 3 | 3 | 3 |
| | Anti-aging agent | Parts by mass | 4 | 4 | 4 | 4 |
| | Sulfur | Parts by mass | 1 | 1 | 1 | 1 |
| | Vulcanization accelerator 1 | Parts by mass | 2 | 2 | 2 | 2 |
| | Vulcanization accelerator 2 | Parts by mass | 2 | 2 | 2 | 2 |
| Structure | First land portion | Lateral groove | Yes | Yes | Yes | Yes |
| | | First sipe | Yes | Yes | Yes | Yes |
| | Second land portion | Intersection angle ° | 80 | 80 | 80 | 80 |
| Snow performance | | Index value | 105 | 103 | 107 | 103 |
| Wet performance | | Index value | 103 | 105 | 102 | 101 |
| Low rolling performance | | Index value | 105 | 101 | 106 | 102 |

|  |  |  | Example 5 | Example 6 | Example 7 | Example 8 |
|---|---|---|---|---|---|---|
| Composition | Conjugated diene rubber 1 | Parts by mass | 25 | 25 | 25 | 25 |
| | Conjugated diene rubber 2 | Parts by mass | 30 | 30 | 30 | 30 |
| | Conjugated diene rubber 3 | Parts by mass | | | | |
| | Conjugated diene rubber 4 | Parts by mass | | | | |
| | Conjugated diene polymer 1 | Parts by mass | 45 | 45 | 45 | 45 |
| | Conjugated diene polymer 2 | Parts by mass | | | | |
| | Difference between Vn amounts of two conjugated diene rubbers | Mass % | 14 | 14 | 14 | 14 |

TABLE 2-continued

|  |  |  | | | | | |
|---|---|---|---|---|---|---|---|
| | Total amount of filler | Parts by mass | 70 | 70 | 70 | 70 |
| | Carbon black | Parts by mass | 5 | 5 | 5 | 5 |
| | Silica | Parts by mass | 65 | 65 | 65 | 65 |
| | Proportion of silica in filler | Mass % | 93 | 93 | 93 | 93 |
| | Silane coupling agent | Parts by mass | 6.5 | 6.5 | 6.5 | 6.5 |
| | Aroma oil | Parts by mass | 5 | 5 | 5 | 5 |
| | Stearic acid | Parts by mass | 2 | 2 | 2 | 2 |
| | Zinc oxide | Parts by mass | 3 | 3 | 3 | 3 |
| | Anti-aging agent | Parts by mass | 4 | 4 | 4 | 4 |
| | Sulfur | Parts by mass | 1 | 1 | 1 | 1 |
| | Vulcanization accelerator 1 | Parts by mass | 2 | 2 | 2 | 2 |
| | Vulcanization accelerator 2 | Parts by mass | 2 | 2 | 2 | 2 |
| Structure | First land portion | Lateral groove | | Yes | No | Yes | Yes |
| | | First sipe | | No | Yes | Yes | Yes |
| | Second land portion | Intersection angle | ° | 80 | 80 | 45 | 90 |
| Snow performance | | Index value | 104 | 103 | 103 | 104 |
| Wet performance | | Index value | 102 | 101 | 103 | 103 |
| Low rolling performance | | Index value | 105 | 105 | 105 | 105 |

Types of raw materials used as indicated in Tables 1 and 2 are described below.

Conjugated diene rubber 1: modified styrene-butadiene rubber; NS560 available from ZEON Corporation (glass transition temperature: −33° C., styrene content: 41 mass %, vinyl content: 29 mass %, oil extended product containing 25 mass % of oil content per 100 parts by weight of the rubber component, second conjugated diene rubber)

Conjugated diene rubber 2: modified styrene-butadiene rubber, E581 available from Asahi Kasei Corporation (glass transition temperature: −36° C.; styrene content: 37 mass %; vinyl content: 43 mass %; oil extended product containing 37.5 mass % of oil content per 100 parts by weight of the rubber component; first conjugated diene rubber)

Conjugated diene rubber 3: modified styrene-butadiene rubber, NS522 available from ZEON Corporation (glass transition temperature of −25° C., a styrene content of 39 mass %, vinyl content of 42 mass %, oil extended product containing 37.5 mass % of oil content per 100 parts by weight of the rubber component)

Conjugated diene rubber 4: modified styrene-butadiene rubber, Nipol1739 available from ZEON Corporation (glass transition temperature of −41° C., styrene content of 40 mass %, vinyl content of 14 mass %, oil extended product containing 37.5 mass % of oil content per 100 parts by weight of the rubber component)

Conjugated diene polymer 1: butadiene rubber, BR54 available from JSR Corporation Conjugated diene polymer 2: butadiene rubber, Nipol 1220, available from ZEON CORPORATION Silica: 9100 GR, available from Evonik Industries AG Carbon black: Sho Black N339, available from Cabot Japan K.K.

Silane coupling agent: Si69 available from Evonik Degussa

Aroma oil: Extract No. 4S, available from Showa Shell Sekiyu K.K.

Stearic acid: beads stearic acid, available from NOF Corporation

Zinc oxide: Zinc Oxide III (available from Seido Chemical Industry Co., Ltd.)

Anti-aging agent: 6PPD available from Flexsys

Sulfur: oil-treated fine powder sulfur, available from Tsurumi Chemical Industry Co., Ltd.

Vulcanization accelerator 1: NOCCELER CZ-G, available from Ouchi Shinko Chemical Industrial Co., Ltd.

Vulcanization accelerator 2: Soxinol D-G available from Sumitomo Chemical Co., Ltd.

As is clear from Tables 1 and 2, the pneumatic tires of Examples 1 to 8 had improved snow performance, wet performance, and low rolling performance over the pneumatic tire of Standard Example 1. Further, these aspects of performance can be provided in a well-balanced manner.

In contrast, in the pneumatic tire of Comparative Example 1, the snow performance deteriorated because the compounded amount of the conjugated diene rubber 1, corresponding to the second conjugated diene rubber of the present invention, was large in the tire rubber composition for a tire used. In the pneumatic tire of Comparative Example 2, the wet performance deteriorated because the compounded amount of the conjugated diene rubber 2, corresponding to the first conjugated diene rubber of the present invention, was large in the rubber composition for a tire used. In the pneumatic tire of Comparative Example 3, the wet performance deteriorated because the compounded amount of the modified conjugated diene polymer was large in the rubber composition for a tire used. In the pneumatic tire of Comparative Example 4, the snow performance deteriorated because the compounded amount of the modified conjugated diene polymer was small in the rubber composition for a tire used. In the pneumatic tire of Comparative Example 5, the low rolling performance deteriorated because the difference between the vinyl content of the conjugated diene rubber 1, corresponding to the first conjugated diene rubber of the present invention, and the vinyl content of the conjugated diene rubber 3, corresponding to the second conjugated diene rubber of the present invention, was small in the rubber composition for a tire used. In the pneumatic tire of Comparative Example 6, the low rolling performance deteriorated because the difference between the vinyl content of the conjugated diene rubber 1, corresponding to the first conjugated diene rubber of the present invention, and the vinyl content of the conjugated diene rubber 4, corresponding to the second conjugated diene rubber of the present invention, was large in the rubber composition for a tire used. In the pneumatic tire of Comparative Example 7, the low rolling performance deteriorated because an unmodified conjugated diene polymer, instead of the modified conjugated diene polymer, was compounded in the rubber composition for a tire used.

REFERENCE SIGNS LIST

1 Tread portion
2 Sidewall portion
3 Bead portion
10 Circumferential groove
11 First main groove
12 Second main groove
21 First land portion
22 Second land portion
23 Third land portion
31,32,33 Sipe
41 Lateral groove
42 Auxiliary groove
42A First groove portion
42B Second groove portion
43 Lug groove
44 Vertical groove
CL Tire equator

The invention claimed is:

1. A rubber composition for a tire comprising 100 parts by mass of a diene rubber composed of from 25 parts by mass to 30 parts by mass of a first conjugated diene rubber having a vinyl content from 35 mass % to 45 mass %, 20 parts by mass to 35 parts by mass of a second conjugated diene rubber having a vinyl content lower by from 5 mass % to 25 mass % than that of the first conjugated diene rubber, and from 35 parts by mass to 50 parts by mass of a modified conjugated diene polymer, the first conjugated diene rubber having a glass transition temperature of from −20° C. to −40° C. and having a tertiary amine having an epoxy group as a modifying group, the second conjugated diene rubber obtained by reacting a polyorganosiloxane to an active terminal of a conjugated diene-based polymer chain having the active terminal formed by making a polymer block A continuous with a polymer block B, the conjugated diene-based polymer chain comprising the polymer block A that comprises from 80 mass % to 95 mass % of isoprene and from 5 mass % to 20 mass % of aromatic vinyl, has an active terminal, and has a weight average molecular weight from 500 to 15000 and the polymer block B that comprises 1,3-butadiene and an aromatic vinyl and has an active terminal, the modified conjugated diene polymer obtained by modifying an active terminal of a conjugated diene polymer having a cis-1,4-bond content of 75 mol % or greater with at least a hydrocarbyloxysilane compound.

2. The rubber composition for a tire according to claim 1, wherein 80 parts by mass or less of a filler containing at least silica is compounded based on 100 parts by mass of the diene rubber, and a compounding proportion of silica in the filler is 80 mass % or greater.

3. A pneumatic tire comprising a tread portion formed by using the rubber composition for a tire described in claim 1.

4. The pneumatic tire according to claim 3, wherein at least four circumferential grooves comprising a pair of first main grooves extending in the tire circumferential direction and a pair of second main grooves extending outside the pair of the first main grooves in the tire circumferential direction are formed on both sides of a tire equator in a tread portion, a first land portion is defined between the pair of first main grooves, a second land portion is defined between the first main groove and the second main groove, a plurality of first sipes having a groove width of 1 mm or less and extending in the tire width direction and a plurality of lateral grooves having a groove width of more than 1 mm and extending in the tire width direction are formed in the first land portion, each of the plurality of first sipes and each of the plurality of lateral grooves are arranged at an identical angle with respect to the tire circumferential direction and connected to one another, and each of the plurality of first sipes and each of the plurality of lateral grooves are open to one of the pair of first main grooves.

5. The pneumatic tire according to claim 4, wherein a plurality of second sipes extending in the tire width direction and a plurality of auxiliary grooves having a bent shape with one end being open to the second main groove and the other end being closed in the second land portion are formed in the second land portion, each of the plurality of second sipes is oriented in the identical direction to each of the plurality of first sipes, each of the plurality of auxiliary grooves comprise a first groove portion extending from the open end to the bent point and a second groove portion extending from the bend point to the closed end, and the intersection angle of the first groove portion with respect to the second sipes is in the range from 45° to 90°.

6. A pneumatic tire comprising a tread portion formed by using the rubber composition for a tire described in claim 2.

7. The pneumatic tire according to claim 6, wherein at least four circumferential grooves comprising a pair of first main grooves extending in the tire circumferential direction and a pair of second main grooves extending outside the pair of the first main grooves in the tire circumferential direction are formed on both sides of a tire equator in a tread portion, a first land portion is defined between the pair of first main grooves, a second land portion is defined between the first main groove and the second main groove, a plurality of first sipes having a groove width of 1 mm or less and extending in the tire width direction and a plurality of lateral grooves having a groove width of more than 1 mm and extending in the tire width direction are formed in the first land portion, each of the plurality of first sipes and each of the plurality of lateral grooves are arranged at an identical angle with respect to the tire circumferential direction and connected to one another, and each of the plurality of first sipes and each of the plurality of lateral grooves are open to one of the pair of first main grooves.

8. The pneumatic tire according to claim 7, wherein a plurality of second sipes extending in the tire width direction and a plurality of auxiliary grooves having a bent shape with one end being open to the second main groove and the other end being closed in the second land portion are formed in the second land portion, each of the plurality of second sipes is oriented in the identical direction to each of the plurality of first sipes, each of the plurality of auxiliary grooves comprise a first groove portion extending from the open end to the bent point and a second groove portion extending from the bend point to the closed end, and the intersection angle of the first groove portion with respect to the second sipes is in the range from 45° to 90°.

* * * * *